US009842356B2

(12) United States Patent
McCabe (10) Patent No.: US 9,842,356 B2
(45) Date of Patent: Dec. 12, 2017

(54) SYSTEM, METHOD, APPARATUS AND COMPUTER PROGRAM PRODUCT FOR INTERFACING A MULTI-CARD RADIO FREQUENCY (RF) DEVICE WITH A MOBILE COMMUNICATIONS DEVICE

(75) Inventor: Colin T. McCabe, Brooklyn, NY (US)

(73) Assignee: III Holdings 1, LLC, Wilmington, DE (US)

( * ) Notice: Subject to any disclaimer, the term of this patent is extended or adjusted under 35 U.S.C. 154(b) by 1380 days.

(21) Appl. No.: 12/336,682

(22) Filed: Dec. 17, 2008

(65) Prior Publication Data
US 2010/0153269 A1 Jun. 17, 2010

(51) Int. Cl.
G06Q 40/00 (2012.01)
G06Q 30/06 (2012.01)
G06Q 20/40 (2012.01)
G06Q 30/02 (2012.01)

(52) U.S. Cl.
CPC ............ *G06Q 30/06* (2013.01); *G06Q 20/40* (2013.01); *G06Q 30/02* (2013.01)

(58) Field of Classification Search
CPC .... G06Q 20/3278; G06Q 30/06; G06Q 20/40; G06Q 30/02
See application file for complete search history.

(56) References Cited

U.S. PATENT DOCUMENTS

| | | | |
|---|---|---|---|
| 7,119,659 B2 * | 10/2006 | Bonalle et al. ............. 340/5.61 |
| 7,366,913 B1 * | 4/2008 | Haley .......................... 713/189 |
| 7,493,288 B2 * | 2/2009 | Biship et al. .................. 705/50 |
| 7,542,942 B2 * | 6/2009 | Peart et al. .................... 705/39 |
| 7,577,616 B2 * | 8/2009 | Zhu ............................... 705/59 |
| 7,637,434 B2 * | 12/2009 | Beenau et al. ............... 235/487 |
| 7,774,231 B2 * | 8/2010 | Pond ...................... B67D 7/145 235/380 |
| 2002/0103753 A1 * | 8/2002 | Schimmel ....................... 705/39 |
| 2003/0132301 A1 * | 7/2003 | Selker ............... G06K 19/0716 235/487 |
| 2004/0256469 A1 * | 12/2004 | Faenza et al. ............... 235/492 |
| 2005/0144437 A1 * | 6/2005 | Ransom et al. .............. 713/151 |
| 2006/0074698 A1 * | 4/2006 | Bishop et al. .................... 705/1 |
| 2006/0132285 A1 * | 6/2006 | Atkinson et al. ............ 340/5.61 |
| 2006/0165060 A1 * | 7/2006 | Dua ............................... 370/352 |
| 2007/0012763 A1 * | 1/2007 | Van de Velde ........ G06Q 20/18 235/380 |
| 2007/0038516 A1 * | 2/2007 | Apple et al. .................... 705/14 |

(Continued)

Primary Examiner — Lalita M Hamilton
(74) Attorney, Agent, or Firm — Meyertons, Hood, Kivlin, Kowert & Goetzel, P.C.

(57) ABSTRACT

An interface for a mobile communication device is provided, including at least one memory unit configured to store read/write data associated with transaction accounts, at least one user interface software application, and at least one contactless communication protocol application. A radio frequency identifier unit having an antenna communicates with a radio frequency identifier reader through a contactless transaction account communications channel distinct from a mobile communications channel of the mobile communication device. An input/output interface unit communicates with a corresponding input/output interface unit of the mobile communication device and provide access to and control of the at least one memory unit and the radio frequency identifier unit by a processor of the mobile communication device.

8 Claims, 3 Drawing Sheets

(56) References Cited

U.S. PATENT DOCUMENTS

| | | | |
|---|---|---|---|
| 2007/0130085 A1* | 6/2007 | Zhu ................................. | 705/75 |
| 2007/0293155 A1* | 12/2007 | Liao ....................... | G06Q 20/32 |
| | | | 455/41.2 |
| 2008/0005037 A1* | 1/2008 | Hammad et al. ................ | 705/67 |
| 2008/0056496 A1* | 3/2008 | Parkinson et al. ............ | 380/277 |
| 2008/0104717 A1* | 5/2008 | Wu et al. ........................ | 726/34 |
| 2008/0133373 A1* | 6/2008 | Perdomo et al. ................ | 705/18 |
| 2008/0288404 A1* | 11/2008 | Pirzadeh et al. ................ | 705/44 |
| 2008/0319905 A1* | 12/2008 | Carlson ............................ | 705/44 |
| 2009/0048936 A1* | 2/2009 | Lerch et al. ..................... | 705/17 |
| 2009/0070272 A1* | 3/2009 | Jain .................................. | 705/75 |
| 2009/0307142 A1* | 12/2009 | Mardikar ......................... | 705/72 |
| 2010/0114773 A1* | 5/2010 | Skowronek ..................... | 705/44 |
| 2010/0252624 A1* | 10/2010 | Van de Velde ...... | G06Q 20/045 |
| | | | 235/382 |

* cited by examiner

SYSTEM, METHOD, APPARATUS AND COMPUTER PROGRAM PRODUCT FOR INTERFACING A MULTI-CARD RADIO FREQUENCY (RF) DEVICE WITH A MOBILE COMMUNICATIONS DEVICE

BACKGROUND OF THE INVENTION

Field of the Invention

The present invention generally relates to contactless payment systems, and more particularly to an interface between a radio frequency (RF) device and a mobile communications device.

Related Art

Consumers often use financial transaction instruments (also referred to as "payment devices") as convenient forms to pay for purchases of goods and/or services ("goods/services") instead of cash or checks. Over the past several years, traditional "plastic" financial transaction instruments have been modified to incorporate contactless electronic features or completely replaced by a contactless payment (only) devices.

A contactless financial transaction instrument provides speedy and convenient transactions for both the consumer and merchant because the instrument is not swiped or inserted. Instead, the contactless payment device is held up to a special RF reader connected to a point of sale device and a secure transaction is processed. Contactless payment devices use RFID (Radio Frequency Identification) information acquisition technology and can come in various shapes and sizes (e.g., fobs, tags), and can have different payment device formats and security features.

A typical contactless payment device includes a transponder and is ordinarily a self-contained device which may be contained on any portable form factor. A system and method for using RFID technology to initiate and complete financial transactions is described in U.S. Pat. No. 7,239,226, which is incorporated herein by reference, as if fully set forth herein.

While contactless payment devices have improved payment efficiency typically, a consumer still carries more than one financial transaction instrument whether contactless or not (e.g., traditional swipe cards). In any event, effecting payment still requires the consumer to have a financial transaction instrument in his or her physical possession when making the purchase, which necessitates the consumer to carry a financial transaction instrument on his or her person while away from home.

The typical consumer also carries a mobile communication device when away from home. In some cases, mobile devices have been used to make payments as well. Such payment solutions use SMS based transactional payments where a consumer sends a payment request via an SMS text message to a particular "shortcode" and a charge is applied to their phone bill. A merchant capable of accepting SMS payments is informed of successful transactions and then releases the goods that have been paid for. Another mobile payment technology is referred to as mobile web payment or WAP billing, where the consumer uses web pages displayed on their mobile phone to make a payment. This technology allows a consumer to purchase goods using a familiar web payment model.

It would be useful to combine mobile communication devices with contactless technologies. One technical challenge in doing so, however, would be to incorporate the features of contactless financial instruments with the processing and user interface components of a mobile device.

It would also be useful to provide users with the ability to choose from multiple transaction accounts through the interface of the mobile communication device. Thus, another technical challenge would be providing access to multiple transaction accounts through a single RF payment device and integrating the RF payment device into a mobile device to allow a consumer the opportunity to select which transaction account to use to make a purchase.

It would also be useful to provide customized information to a consumer through the mobile device, whether the information is from a merchant, a card issuer, or other service provider. The technical challenge here would be to communicate messages between the RF payment device, the mobile device, the merchant, the transaction processor and/or card issuer, to name a few, using one or more communication channels.

BRIEF DESCRIPTION OF THE INVENTION

The present invention meets the above-identified needs by providing methods, systems, apparatuses, and computer program products for using, e.g., RFID (Radio Frequency Identification) technology to enable a mobile communication device linked to one or more financial account to operate as a contactless payment device.

In accordance with one embodiment of the present invention, there is provided an interface for a mobile communication device, including at least one memory unit configured to store read/write data associated with transaction accounts, at least one user interface software application, and at least one contactless communication protocol application. A radio frequency identifier unit having an antenna is configured to communicate with a radio frequency identifier reader through a contactless transaction account communications channel distinct from a mobile communications channel of the mobile communication device. In addition, an input/output interface unit communicates with a corresponding input/output interface unit of the mobile communication device and provide access to and control of the at least one memory unit and the radio frequency identifier unit by a processor of the mobile communication device.

In accordance with another embodiment of the present invention, there is provided a mobile communications device having a slot for connecting to a removable card, including a processor configured to execute at least one user interface software application. An interface card constructed in accordance with the removable card is also provided. The interface card includes a radio frequency identifier unit, at least one memory unit configured to store read/write data associated with transaction accounts, and which is configured to receive commands from the processor to perform a contactless transaction with a radio frequency identifier reader in accordance with the read/write data, and at least one contactless communication protocol application.

In accordance with another embodiment of the present invention, there is provided a method of interfacing a mobile communication device to a contactless payment system. The method includes storing, in at least one memory unit, read/write data associated with transaction accounts, at least one user interface software application, and at least one contactless communication protocol application, communicating commands generated by a processor of the mobile communication device to an interface device having a radio frequency identifier unit and an antenna, and communicating contactless transaction information between the radio frequency identifier unit and a radio frequency reader through a contactless transaction account communications channel distinct from a mobile communications channel of the mobile communication device in accordance with the read/write data and the at least one contactless communication protocol application.

In accordance with another embodiment of the present invention, there is provided a computer-readable medium having stored thereon sequences of instructions, the sequences of instructions including instructions which when executed by a processor causes the processor to perform: communicating commands generated by a processor of the mobile communication device to an interface device having a radio frequency identifier unit and antenna, the interface capable of storing read/write data associated with a plurality of transaction accounts, at least one user interface software application, and at least one contactless communication protocol application; and communicating contactless transaction information between the radio frequency identifier unit and a radio frequency identifier reader through a contactless transaction account communications channel distinct from a mobile communications channel of the mobile communication device in accordance with the read/write data and the at least one contactless communication protocol application.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings.

DETAILED DESCRIPTION

The present invention is directed to methods, systems, apparatuses, and computer program products which can provide for convenient and reliable payment using RFID (Radio Frequency Identification) technology incorporated into a mobile communications device.

The term "merchant" may be used herein to refer to an individual, business, entity, hardware and/or software that receives a card number to facilitate a transaction, whether or not in exchange for goods or services. For example, a merchant may be an online bookstore or a local restaurant.

It is noted that the terms "customer," "consumer," or "user" are used interchangeably herein to refer to an individual, business entity, etc., that may purchase goods or services from a merchant.

An "account," "account number," or "account code," as used herein, may include any device code, number, letter, symbol, digital certificate, smart chip, digital signal, analog signal, biometric, or other identifier/indicia suitably configured to allow a consumer to access, interact with, or communicate with a financial transaction system such as, for example, authorization/access code, personal identification number (PIN), Internet code, digital certificate, biometric data, and/or other identification indicia. The account number may optionally be associated with any financial transaction instrument (e.g., a charge, credit, debit, prepaid, telephone, smart, magnetic stripe, bar code, transponder, or radio frequency card).

It is noted that the terms "financial account," "financial transaction account," and "transaction account" are used interchangeably herein and may include any credit, charge, debit, checking, savings, reward, loyalty, or the like account. The account may be maintained by a transaction account provider (e.g., payment authorization center) and may be used to complete a financial transaction. A typical account number (e.g., account data) may be correlated to a credit or debit account, loyalty account, or rewards account maintained and serviced by such entities as American Express, Visa and/or Mastercard, or the like.

A "mobile communication device" includes, but is not limited to, any of cellular telephones, beepers, pagers, iPods®, personal digital assistants (PDAs), and Blackberry® type devices.

According to an example embodiment of the present invention, the processing components and user interface of a mobile communication device are leveraged by coupling an interface between the mobile communication device and one or more RFID devices. Each RFID device operates in accordance with a respective contactless payment device standard. The interface thus provides a physical connection between the hardware of a mobile communication device and one or more RFID devices. It also provides some or all of the software to perform the functions required by the mobile communication device and each RFID device.

The interface may be separate from or include the RFID devices. In other words, the interface may incorporate contactless technology used for performing contactless transactions as well as control logic for interfacing to the mobile communications device. The control logic (e.g., software), when executed by a processor in the mobile communications device, causes the processor to perform the functions described in more detail below.

With the control logic loaded onto the mobile communications device, a consumer is enabled to use the device as a contactless payment device to make a purchase. The configuration also facilitates a merchant with obtaining payment for the purchase, by incorporating into the mobile communication device some, or all of the features typically associated with POS devices, such as consumer approval or authorization interfacing.

Figure 1:
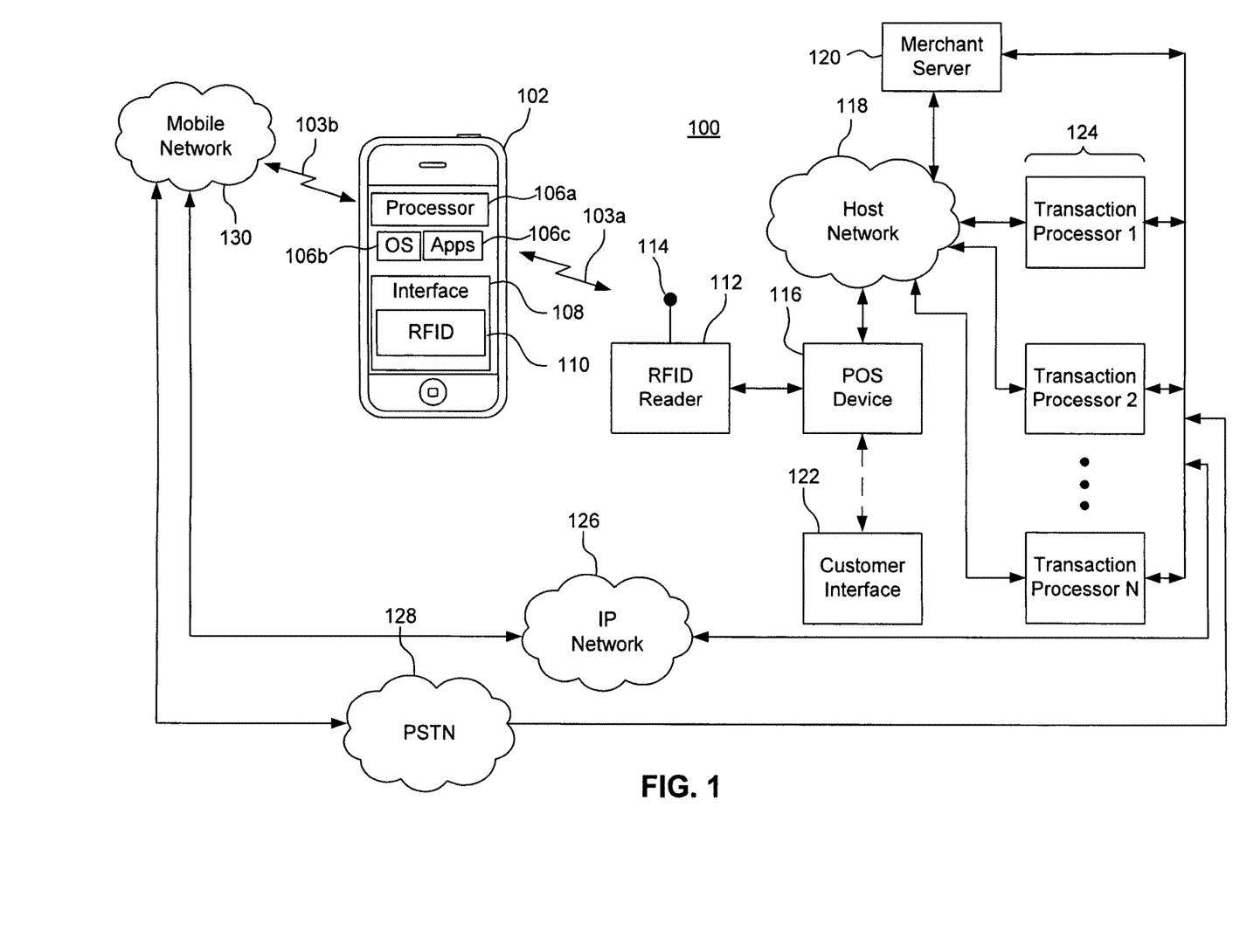
FIG. 1 illustrates a contactless payment system according to an embodiment of the present invention.

FIG. 1 is a diagram of an example contactless payment system 100 in accordance with an embodiment of the present invention. Generally, system 100 links one or more financial transaction accounts to a mobile communication device 102 operating as a contactless payment device. This eliminates the inconvenience of carrying additional contactless payment devices.

Mobile communication device 102 includes a processor 106a running an operating system (OS) 106b and various applications 106c. OS 106b is the software component of the mobile communication device 102 that is responsible for managing and coordinating activities, as well as sharing resources of mobile communication device 102 and acting as a host for applications 106c. As a host, OS 106b also handles the operations details of the hardware of mobile communication device 102.

An example application 106c (i.e., control logic) is a payment application that enables a consumer to complete a financial transaction using the mobile communication device 102 as a contactless payment device. Another example application 106c may implement one or more contactless communications protocols associated with the transaction accounts or hardware and manage data associated with the accounts. Yet another application 106c may generate a screen on the user interface of the mobile communication device 102 using, for example, graphics associated with the conventional "plastic" financial transaction instrument, as well as manage user input through the user interface.

Control logic and data may be stored on either interface 108 or mobile communication device 102, or a combination of both. This allows certain features, such as security features, to be loaded onto interface 108 while the features such as a user interface are loaded onto memory of the mobile communication device. As will be explained in more detail below, interface 108 can be a physically separate device in the form of a card capable of being inserted into, for example, a slot of mobile communications device 102. Thus, the mobile communications device 102 can be manufactured separately from interface 108.

In one embodiment, interface 108 is connected via an input/output interface to a corresponding input/output interface of the mobile communication device 102. The construction of interface 108 and hence its input/output interface unit (not shown) depends on the card format associated with the mobile communication device (e.g., secure digital, subscriber identity module, compact flash, etc.).

In this embodiment interface 108 also includes an RFID unit 110, such that interface 108 in conjunction with associated hardware and applications of mobile communication device 102 create a universal contactless transaction device which communicates with a point-of-sale (POS) device 116 through an RFID reader 112. Particularly, RFID unit 110 communicates with RFID reader 112 through an RFID communications channel 103a.

Transmissions through RFID communications channel 103a may be transmitted through the antenna of the mobile communication device 102 (not shown) and antenna 114 of RFID reader 112 or through a physically separate antenna (not shown) incorporated into the RFID unit 110 and antenna 114. Mobile communication device 102 communicates with a mobile network 130 through a mobile communications channel 103b.

RFID reader 112 communicates with POS device 116 which in turn communicates with a merchant server 120 through a host network 118. Mobile communication device 102 can also communicate nontransaction related messages to merchant server 118 through interface 108 and RFID unit 110 and vice versa. In an embodiment, the unused or reserved fields in the contactless communications protocol packet are used to carry such messages.

System 100 also includes one or more transaction processors 124 for processing transaction requests generated by POS device 116. The particular transaction processor which performs the transaction processing depends on which financial transaction account is selected by a user through the user interface of the mobile communication device 102.

Transaction processors 124 can also communicate with the mobile communication device 102 through an IP network 126 and/or a public switched telephone network (PSTN) 128, and a mobile network 130, via mobile communication channel 103b. Messages from a particular card issuer, third party, and the like, may thus be communicated to the user through either channel 103a or 103b.

In one embodiment, a transaction request from POS device 116 is transmitted only to the transaction processor associated with the selected financial transaction account. A user can also distribute the purchase cost over several transaction accounts (e.g., credit, debit, loyalty, etc.), by selecting more than one account from the mobile communication device user interface discussed in more detail below.

Mobile communication device 102 may receive instructions during registration on how it should be associated with a particular user. The information received during registration, in turn, may be used to authorize a transaction. For example, a mobile communication device 102 with a biometric reader (e.g., camera with facial recognition software, fingerprint reader, voice recognition software, etc., not shown) can run an application which passes biometric information of a user to interface 108. Once this information is associated and stored on interface 108, a user may be prompted to input the biometric when making a purchase. If the biometric matches the biometric information pre-stored on interface 108, the instant biometric information, or information based in part on the inputted or stored biometric information is transmitted to the RFID reader 112 to complete the transaction.

Although the point of interaction device is described herein with respect to a merchant POS device 116, the invention is not to be so limited. Indeed, a merchant POS device is used herein by way of example, and the point of interaction device may be any device capable of receiving contactless transaction account information from mobile communication device 102. In this regard, the POS device 116 may be any point of interaction device enabling the user to complete a transaction using a mobile communication device 102 as a contactless payment device, as described herein.

POS device 116 may also be in communication with a customer interface 122 either physically or virtually through the POS device 116, IP network 126, PSTN 128 and/or mobile network 130 for entering, for example, customer identity verification information, authorization information and the like.

POS device 116 is in communication with a merchant host network 118 for processing a transaction request. In response, merchant server 120 or one of the transaction processors 124 can communicate data such as up-sell/cross-sell advertisements to the mobile communication device 102 through merchant host network 118. In this regard, merchant server 120 communicates messages through host network 118 to POS device 116 acting as a gateway for passing the messages to the consumer. Such messages can also be communicated through channel 103b when communicated to a transaction processor 124 acting as a gateway.

The merchant host network 118 communicates a transaction request for payment to one or more of the transaction processors 124. The transaction request may include an identification code of the consumer's mobile communication device 102, a purchase amount, a type of purchase, an identification of the merchant, and any other relevant information.

Figure 2:
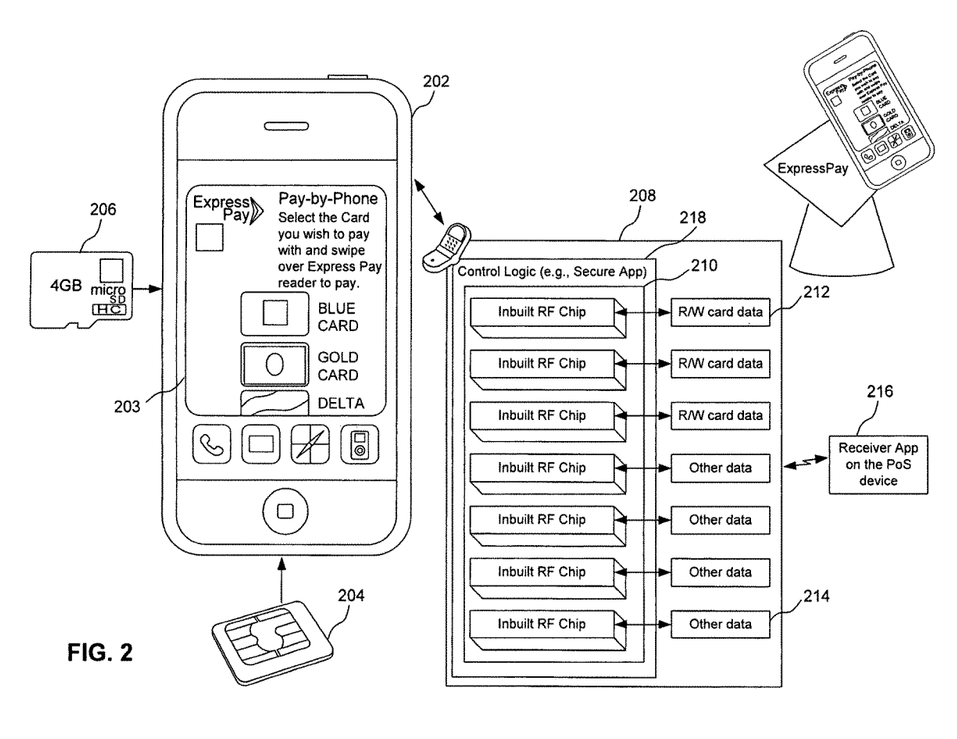
FIG. 2 illustrates an embodiment of an exemplary multi-card RFID device in the form of a mobile communications device capable of receiving one or more embedded RFID devices.

FIG. 2 depicts an exemplary mobile communication device 202 in accordance with an embodiment of the present invention. An exemplary interface, as described above with respect to block 108 (FIG. 1), is depicted in FIG. 2 as interface 208. Interface 208 includes RFID device hardware 210 and control logic 218. As described above, control logic 218 can be executed directly from interface 208 (e.g., from memory on interface 208) or loaded onto the mobile communication device 202, or a combination of both, and scheduled by OS 106b. For example, security control logic can be stored on interface 208 in accordance with one or more contactless communications protocols. Interface 208 also includes memory for storing data, including read/write card data 212 and other associated data 214 (e.g., biometric data, preference data, etc.). In addition, new contactless communications protocols and related information can be uploaded and stored on memories 212 and 214, or mobile communication device 102 memory (not shown).

Interface 208 can be implemented in the form of a card such as a RFID micro secure digital (SD) card 206. In this embodiment the card includes embedded RFID technology (i.e., RFID unit 110) that operates through the enclosure. The software (i.e., control logic) run by processor 106*a* is used to control RFID micro SD card 206.

Should RFID micro SD card 206 be removed from the mobile communication device 202 the RFID capability is blocked. One way to achieve this is by enabling RFID micro SD card 206 with a security key such as a token key which is invoked by an application 106*c* on mobile communication device 202.

Interface 208 also can be implemented in the form of an RFID subscriber identity module (SIM) card 204. In this embodiment, initially, the mobile communication device running associated control logic authenticates and copies the data loaded onto a user's original SIM card. The control logic them requests the user insert RFID SIM card 204. Once RFID SIM card 204 is loaded onto mobile communication device 202, all of the information copied from the user's original SIM card is loaded onto RFID SIM card 204. As with RFID micro SD card 206, RFID SIM card 204 operates in conjunction with an associated application running on mobile communication device 202 which can be configured to invoke security key such as a token key, and can be disabled if removed. For security reasons a user may be prompted to have the original SIM card entered in order to erase it.

POS device (116, FIG. 1) executes application module 216 to communicate with the mobile communication device 102 based on the contactless communications protocol(s) being used for a particular transaction. As shown in FIG. 2, a user of the mobile communication device 202 selects (e.g., using a touch pod user interface 103) which transaction account to use and the contactless communications protocol uses the associated protocol to communicate with the RFID reader 112. In this example, the user has selected an Express Pay account with their "Gold Card" account.

More particularly, upon initiation by the user, a payment application program, for example a J2ME (Java 2 Platform) program, is executed on the mobile communication device 202. The payment application program causes a user interface 203 to be displayed on the mobile communication device 202, enabling the consumer or an authorized user to be presented with the option of using a financial transaction account linked to the mobile communication device 202 to make the purchase.

Figure 3:
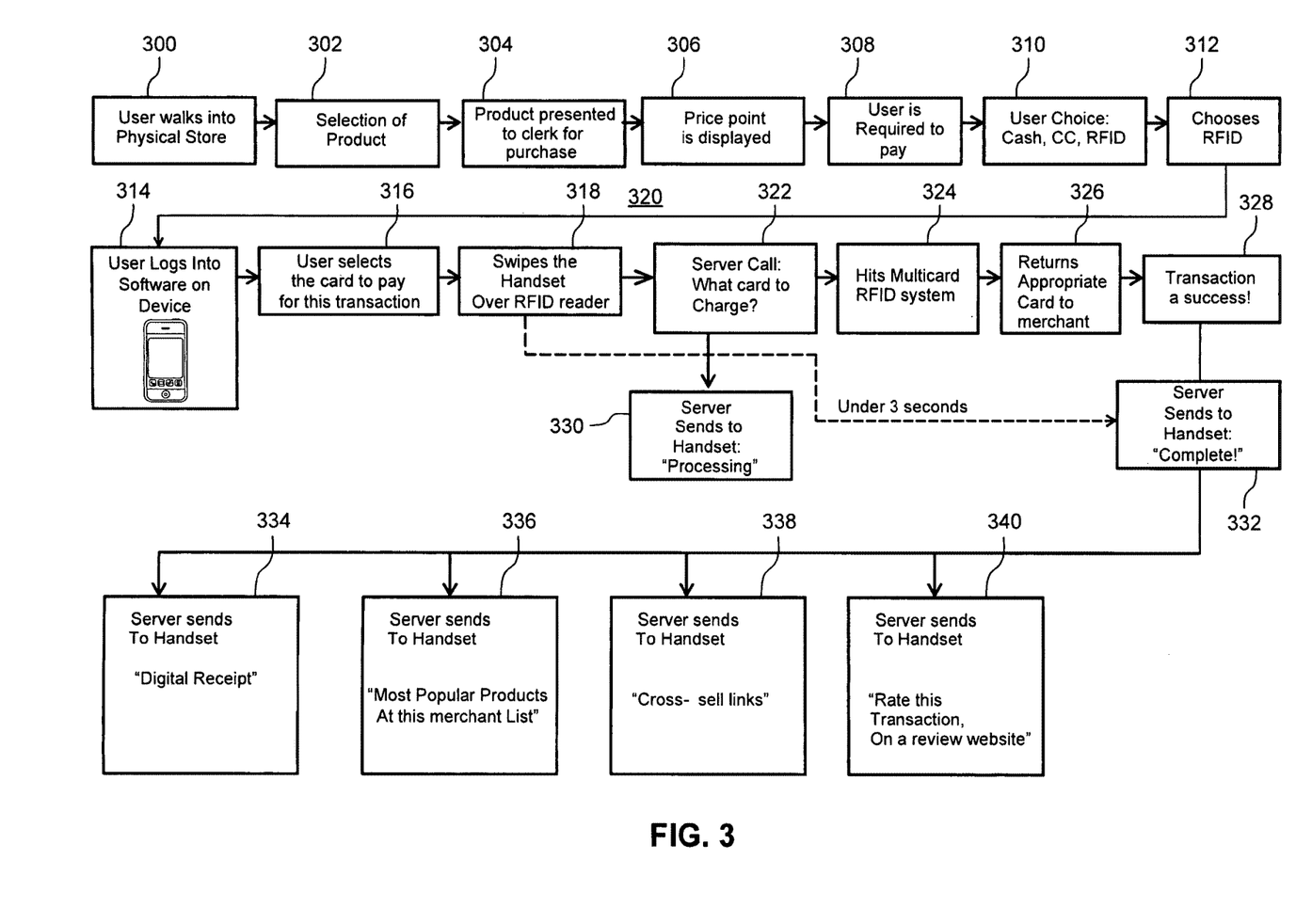
FIG. 3 illustrates a flowchart illustrating a contactless payment process according to an embodiment of the present invention.

FIG. 3 is a flowchart illustrating an exemplary process for performing a transaction using mobile communication device 202. Generally, the mobile communication device is linked to at least one financial transaction instrument by the hardware and/or software, thereby virtualizing the financial transaction instrument(s) of a user onto the device. A purchase is charged directly to an account linked to a financial transaction instrument when the consumer uses the mobile communication device to make the purchase, since a financial transaction instrument is integrated with the mobile communication device. In addition, multiple transaction accounts may be linked to the mobile device. This eliminates the need for a consumer to carry his or her financial transaction instrument(s) while away from home. This also allows the consumer to select more than one account to make the purchase.

With the mobile communication device powered on, the user initiates the payment process, invoking the payment application program, which brings up a login screen on the device. The user logs in and selects his or her payment method of choice (e.g., a particular financial transaction instrument linked to the mobile communication device) from a menu listing the options. Once enabled, the mobile communication device can operate as a contactless payment device in communication with an RFID receiver at the merchant location. Accordingly, a mobile communication device can act as an actual, physical payment device. In this way, the present invention can provide a simple, efficient, and convenient payment method that integrates with an RFID-enabled mobile communication device.

Referring to FIG. 3, after a user enters a store 300, selects a product 302 and presents the product to a clerk (or self checkout device) 304, a price point is displayed, as shown in block 306. Should the user decide to continue with the transaction, the user is required to pay using either cash, a traditional "plastic" credit card or a contactless transaction device (e.g., RFID device) as shown in blocks 308 and 310. In this example, the user selects to pay using an RFID device, as shown in block 312.

Referring to both FIGS. 2 and 3, in block 314, the user logs into the associated software running on the mobile communications device 202. This may entail the user being prompted to enter a PIN ("personal identification number"), presenting a biometric to the mobile communication device 202, and the like, to confirm that the user is an authorized user or card member.

Once logged in, the user selects from a list of transaction accounts associated to the mobile communication device 202, as shown in block 316. An exemplary selection menu is shown in FIG. 2 interface GUI 203. Once selected, the user swipes the mobile communication device over RFID reader 112 (FIG. 1), as shown in block 318. The user can also view information such as the identification of the merchant, and the purchase type and amount via the interface and then respond, for example by replying "Yes" or "No", to a request for purchase confirmation.

The mobile communication device 202 and the RFID reader 112 may then engage in mutual authentication during which a payment application program is invoked on the mobile communication device 202. The associated transponder identification and/or account identifier(s) are provided to the RFID reader 112 in accordance with the protocol of RFID reader 112, which may further provide the information to the merchant system POS device 116 (FIG. 1). When the mobile communication device 202 is presented for payment it is interrogated by the RFID reader 112. Particularly, RFID device hardware 210 is interrogated and in turn communicates with RFID reader 112 and the mobile communication device operating system 106*b* and application(s) 106*c* through interface 208.

Next, the merchant server 120 or POS device 116 (FIG. 1) determines, based on the communications received from the mobile communication device 202, which card issuer is associated with the transaction account selected by the user, as shown at blocks 322 and 324. At substantially the same time, merchant server sends the mobile communication device 202 a message indicating that it is "processing" the request. This message may be displayed on GUI 203 or through an audio output unit of the mobile communication device. At block 326, merchant server 120 (or POS device 116) processes the received communication and forwards the appropriate card information in one or more transaction requests to transaction processor 124, after which the transaction is processed and a message is sent to the mobile communication device 202 indicating that the transaction is complete, as shown in blocks 328 and 332. The merchant server 120 and/or transaction processors 124 can also send various additional messages to the mobile communications device 202 through either the RFID reader 112 or IP network 126/PSTN network 128 and mobile network 130. Such additional messages can include a digital receipt 334, advertisements 336, cross-sell links 338, and questionnaires 340, and the like.

If, after block 318 a user is notified that the payment application program is not already present on the mobile communication device 202, the payment application program can be downloaded from the transaction processor 124 or merchant server 120 upon permission from the user. In this way, the payment application program can be transmitted to the mobile communication device 202 along with a purchase message in the event that such application program is not already present on the mobile communication device 202.

According to an embodiment, a payment application file is downloaded from merchant server 120 to the mobile communication device 202. The download process can be initiated by, for example, an SMS text message sent to the mobile communication device 202. The text message contains a URL pointing to a unique .jad file, which in turn contains a URL to a java application that performs as the payment application once installed on the mobile communication device 202. The java application requests a personalized package from the server 120, containing cardmember information. The cardmember information is stored on the mobile communication device 202 to enable the device 202 to make mobile payment transactions. It is noted that the cardmember information could pertain to financial transaction accounts from more than one particular card issuer. Further, while a java application is described in this embodiment, it is of course to be understood that others may also be used, such as Java2 or Flashlight, etc.

Mobile communication device 202 can be used with a financial account of any type (e.g. a loan account, a savings account, a checking account, or any other banking account), even if not associated with a financial transaction instrument.

The present invention or any part(s) or function(s) thereof may be implemented using hardware, software, or a combination thereof, and may be implemented in one or more computer systems or other processing systems. Useful machines for performing some or all of the operations of the present invention include general-purpose digital computers or similar devices.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

As described above, mobile communication device 202 includes a user interface 203. The user interface forwards graphics, text, and other data from its communication infrastructure (or from a frame buffer (not shown)) for display. Alternatively, user interface can also output audio.

Mobile communication device 202 also includes a main memory, which preferably is a random access memory (RAM), and may also include a secondary memory. The removable-storage drive reads from and/or writes to a removable storage unit in a well-known manner. As will be appreciated, the removable storage unit includes a computer-usable storage medium having stored therein computer software and/or data.

As described above the secondary memory may include other similar devices for allowing computer programs or other instructions to be loaded into the computer system. In addition to the cards (FIG. 2, 204, 206) described above, such devices may include a removable storage unit and an interface (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units and interfaces that allow software and data to be transferred from the removable storage unit to the mobile communication device 202.

Mobile communication device 202 may also include a communications interface, which allows software and data to be transferred between mobile communication device 202 and external devices (not shown). Examples of the communications interface may include a modem, a network interface (e.g., an Ethernet card), a communications port, a Personal Computer Memory Card International Association ("PCMCIA") interface, and the like. Software and data transferred via the communications interface are in the form of signals, which may be electronic, electromagnetic, optical or another type of signal that is capable of being received by the communications interface. These signals are provided to the communications interface via a communications path (e.g., a channel). The communications path carries the signals and may be implemented using wire or cable, fiber optics, a telephone line, a cellular link, a radio-frequency ("RF") link, or the like.

As used herein, the phrases "computer program medium" and "computer usable medium" may be used to generally refer to a removable storage unit used with the removable-storage drive, a hard disk installed in the hard disk drive, and/or the signals, for example. These computer program products provide software to the computer system. The present invention may be implemented or embodied as one or more of such computer program products.

Computer programs (also referred to as software, applications and computer control logic) are stored in the main memory and/or the secondary memory. The computer programs may also be received via the communications interface (e.g., input/output interface). Such computer programs, when executed, enable the computer system to perform the features of the present invention, as discussed herein. In particular, the computer programs, when executed, enable the processor to perform the features of the present invention. Accordingly, such computer programs represent controllers of the computer system.

In an embodiment where the present invention is implemented using software, the software may be stored in a computer program product and loaded into the mobile communication device 202 using the removable-storage drive, the hard drive, a SIM card, SD card, or the communications interface. The control logic (i.e., software), when executed by the processor, causes the processor to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s). In yet another embodiment, the present invention is implemented using a combination of both hardware and software.

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A subscriber identity module (SIM) card, comprising:
a memory unit configured to store data associated with a transaction account and authentication data of a user;
a radio frequency identifier (RFID) interface configured to communicate with an RFID reader; and
a device interface configured to couple the SIM card to a mobile communication device such that the SIM card is removable from the mobile communication device;
wherein the SIM card is configured to:
establish a token key with the mobile communication device such that functionality of the SIM card becomes disabled responsive to the SIM card being removed from the mobile communication device;
receive, via the device interface from the mobile communication device, an indication that the user has requested payment for a transaction with the transaction account;
perform an authentication of the user by using the authentication data stored in the memory unit; and
based on the authentication, communicate, via the RFID interface, payment information for the transaction to a point of sale (POS) terminal, wherein the SIM card is configured to use the stored data to communicate the payment information.

2. The SIM card of claim 1, wherein the authentication data includes at least one of biometric data and login data.

3. The SIM card of claim 1, wherein the SIM card is configured to:
receive, via the device interface, an indication specifying a selection of the transaction account from among a plurality of transaction accounts to use for the transaction; and in response to the selection, transfer, via the RFID interface, payment information for the transaction account to an RFID reader of the POS terminal.

4. A method comprising:
a subscriber identity module (SIM) card receiving, from a mobile communication device, a request that includes a selection of a plurality of transaction accounts and a payment amount, wherein the SIM card is configured to be inserted into the mobile communication device such that the SIM card is removable from the mobile communication device;
in response to the request, the SIM card authenticating a user of the mobile communication device based on authentication data stored in a memory of the SIM card, wherein the memory stores information about the plurality of transaction accounts;
based on the authenticating, the SIM card communicating transaction account information associated with the selection and the payment amount via a radio frequency identifier (RFID) circuit in the SIM card to an RFID reader of a point of sale (POS) terminal; and
the SIM card establishing a token key with an application on the mobile communication device such that functionality of the SIM card becomes disabled responsive to the SIM card being removed from the mobile communication device.

5. The method of claim 4, wherein the stored authentication data is at least one of biometric data and login data.

6. The method of claim 4, wherein the selection is in response to a graphical display associated with transaction account data on a user interface of the mobile communication device.

7. A subscriber identity module (SIM) card, comprising:
a memory unit configured to:
store data associated with a transaction account and authentication data of a user, wherein the authentication data is usable to perform an authentication of the user;
a device interface configured to:
couple the SIM card to a mobile communication device such that the SIM card is removable from the mobile communication device, wherein the SIM card becomes disabled responsive to the SIM card being removed from the mobile communication device; and
receive an indication that the user has requested payment for a transaction with the transaction account; and
a radio frequency identifier (RFID) interface configured to:
communicate information with a point of sale (POS) terminal via an RFID reader, wherein the information communicated to the POS terminal includes payment information for the transaction that is communicated based on a performed authentication of the user by the authentication data stored in the memory unit.

8. The SIM card of claim 7, wherein the memory unit is configured to store a token key established with the mobile communication device such that functionality of the SIM card becomes disabled responsive to the SIM card being removed from the mobile communication device.

* * * * *